(12) United States Patent
Kawanishi (10) Patent No.: US 12,545,231 B2
(45) Date of Patent: Feb. 10, 2026

(54) CONTROL APPARATUS AND METHOD OF HYBRID ELECTRIC VEHICLE

(71) Applicant: TOYOTA JIDOSHA KABUSHIKI KAISHA, Aichi-ken (JP)

(72) Inventor: Noritsugu Kawanishi, Aichi-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 294 days.

(21) Appl. No.: 18/349,957

(22) Filed: Jul. 11, 2023

(65) Prior Publication Data

US 2024/0017714 A1    Jan. 18, 2024

(30) Foreign Application Priority Data

Jul. 13, 2022    (JP) .................................. 2022-112313

(51) Int. Cl.
*B60W 20/13*    (2016.01)
*B60W 10/06*    (2006.01)

(52) U.S. Cl.
CPC ............ *B60W 20/13* (2016.01); *B60W 10/06* (2013.01); *B60W 2510/0638* (2013.01); *B60W 2510/244* (2013.01); *B60W 2710/0644* (2013.01)

(58) Field of Classification Search
CPC ........... B60W 20/13; B60W 2510/244; B60W 10/06; B60W 2510/0638; B60W 2710/0644; B60W 20/11; B60W 20/17; B60W 20/10; B60W 2710/0677; B60K 6/445; Y02T 10/62
See application file for complete search history.

(56) References Cited

FOREIGN PATENT DOCUMENTS

| JP | H11103501 A | * | 4/1999 |
|---|---|---|---|
| JP | 2013071622 A | | 4/2013 |

* cited by examiner

*Primary Examiner* — Jacob S. Scott
(74) *Attorney, Agent, or Firm* — HAUPTMAN HAM, LLP (57) ABSTRACT

A control apparatus controls a hybrid electric vehicle including an engine, an electric motor that uses power from the engine to generate electric power, and a battery. The control apparatus sets a target power of the engine based on a power required for driving the vehicle and a target charging power of the battery and sets a larger one of a required rotational speed of the engine corresponding to the target power and a lower limit rotational speed to a target rotational speed of the engine. When a state in which the target charging power is limited to be small and the required rotational speed is less than the lower limit rotational speed continues for a predetermined time, the control apparatus sets the target rotational speed such that a rotational speed of the engine becomes a value within a fluctuation range of the required rotational speed within the predetermined time.

7 Claims, 4 Drawing Sheets

CONTROL APPARATUS AND METHOD OF HYBRID ELECTRIC VEHICLE

CROSS-REFERENCE TO RELATED APPLICATION

The present disclosure claims priority to Japanese Patent Application No. 2022-112313 filed, Jul. 13, 2022, which is incorporated herein by reference in its entirety including specification, drawings and claims.

TECHNICAL FIELD

The present disclosure relates to a control apparatus and method of a hybrid electric vehicle that includes an engine, an electric motor that uses at least part of power from the engine so as to generate electric power, and a battery chargeable from electric power from the electric motor.

BACKGROUND

A conventionally known control device for a hybrid electric vehicle calculates a sum of a first required power to close SOC of a battery including a lithium ion secondary battery to a target value and a second required power required for driving the hybrid electric vehicle as a vehicle required power, and distributes power between an engine and a motor generator based on input and output permission power values (as described in, for example, Japanese Patent Application Laid Open No. 2013-071622). In order to suppress precipitation of lithium on a negative electrode of the lithium ion secondary battery, the control apparatus changes the input and output permission power values based on a history of charging and discharging current from the battery and changes the first required power based on the history of charging and discharging current. In detail, when the charging current to the battery is less than a charging threshold, a first standard value is set to the input permission power value. When the charging current to the battery is more than the charging threshold, the input permission power value is limited rather than the first standard value. Further, when a difference between the charging current to the battery and the charging threshold becomes smaller than a predetermined value, a charging upper limit value of the battery is further limited, and the first required power is set to be small as a charging power.

SUMMARY

When there is a risk of lithium precipitation in the above conventional hybrid electric vehicle, the input and output permission power value increases or decreases according to magnitude of the charging current and the first required power fluctuates, thereby the vehicle required power fluctuating. Since power commanded to the engine and the motor generator increases or decreases in accordance with the change in the vehicle required power, rotational speeds of the engine and the motor generator speeds increase or decrease in a short cycle, and noise and vibration may become apparent.

A main object of the present disclosure is to suppress noise and vibration to become apparent in a hybrid electric vehicle when a charging of the battery by electric power from an electric motor that uses power from an engine so as to generate electric power is limited.

A control apparatus of a hybrid electric vehicle of the present disclosure includes an engine, an electric motor that uses at least part of power from the engine so as to generate electric power, and a battery chargeable from electric power from the electric motor. The control apparatus further includes: a target power setting module programmed to set a target power of the engine based on a power required for driving the hybrid electric vehicle and a target charging power of the battery; and a target rotational speed setting module programmed to set a larger one of a required rotational speed of the engine corresponding to the target power and a lower limit rotational speed to a target rotational speed of the engine. When a state in which the target charging power is limited to be small and the required rotational speed is less than the lower limit rotational speed continues for a predetermined time, the target rotational speed setting module sets the target rotational speed such that a rotational speed of the engine becomes a value within a fluctuation range of the required rotational speed within the predetermined time.

A control method of the present disclosure is adapted to a hybrid electric vehicle includes an engine, an electric motor that uses at least part of power from the engine so as to generate electric power, and a battery chargeable from electric power from the electric motor. The method includes: setting a target power of the engine based on a power required for driving the hybrid electric vehicle and a target charging power of the battery; and setting a larger one of a required rotational speed of the engine corresponding to the target power and a lower limit rotational speed to a target rotational speed of the engine. When a state in which the target charging power is limited to be small and the required rotational speed is less than the lower limit rotational speed continues for a predetermined time, the target rotational speed is set such that a rotational speed of the engine becomes a value within a fluctuation range of the required rotational speed within the predetermined time.

The control apparatus and method of the hybrid electric vehicle suppress noise and vibration to become apparent in a hybrid electric vehicle when the charging of the battery by electric power from the electric motor that uses power from the engine so as to generate electric power is limited.

DESCRIPTION OF EMBODIMENTS

The following describes some aspects of the present disclosure with reference to drawings.

Figure 1:
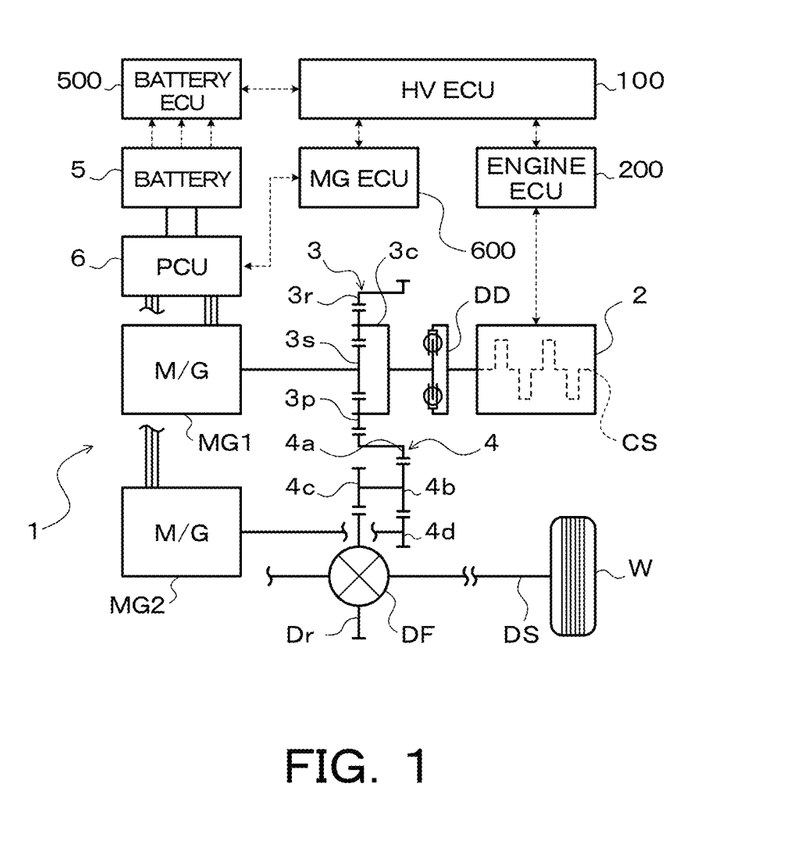
FIG. 1 is a schematic configuration diagram illustrating the hybrid electric vehicle controlled by the control apparatus of the present disclosure.

FIG. 1 is a schematic configuration diagram illustrating a hybrid electric vehicle (HEV) 1 controlled by the control apparatus of the present disclosure. The hybrid electric vehicle 1 shown in FIG. 1 includes an engine 2, a single pinion planetary gear 3 or a power distribution mechanism, a gear train 4, motor generators MG1 and MG2 respectively configured as a synchronous motor generator (three-phase AC motor), a battery (power storage device) 5, a power control unit (hereinafter referred to as "PCU") 6 connected with the battery 5 and configured to drive the motor generators MG1 and MG2, and a hybrid electronic control unit (hereinafter referred to as "HVECU") 100 configured to control the entire vehicle.

The engine 2 is an internal combustion engine configured to generate power by explosive combustion of a mixture of a hydrocarbon fuel (gasoline) and the air. The engine 2 converts reciprocating motion of pistons (not shown) accompanying combustion of the mixture of hydrocarbon fuel and air in a plurality of combustion chambers into rotational motion of a crankshaft (output shaft) CS. The engine 2 is not limited to a gasoline engine, and may be an LPG engine or a diesel engine.

The engine 2 is controlled by an engine electronic control unit (hereinafter referred to as "engine ECU") 200. The engine ECU 200 includes a microcomputer with a CPU, ROM, RAM, and input/output interface (not shown), various drive circuits, various logic ICs, and the like. The engine ECU 200 calculates a rotational speed Ne of the engine 2 (crankshaft CS) based on a crank position from a crank angle sensor (not shown), and also calculates a load factor KL based on an intake air amount from an airflow meter (not shown) and the rotational speed Ne of the engine 2. The engine ECU 200 controls the intake air amount, a fuel injection amount, an ignition timing, and the like of the engine 2 based on command signals from the HVECU 100, the rotational speed Ne, the load factor KL, and the like.

The planetary gear 3 is a differential rotation mechanism that includes a sun gear 3s, a ring gear 3r, and a planet carrier 3c that rotatably supports a plurality of pinion gears 3p. As shown in FIG. 1, the sun gear 3s is coupled to a rotor of the motor generator MG1. The planet carrier 3c is coupled to a crankshaft CS of the engine 2 via a damper mechanism DD. The ring gear 3r or an output element coaxially and integrally rotates with the counter drive gear 4a (output member) of the gear train 4.

The gear train 4 includes a counter driven gear 4b and a final drive gear (drive pinion gear) 4c in addition to the counter drive gear 4a. The final drive gear 4c meshes with a differential ring gear Dr of a differential gear DF and coupled with left and right wheels W (drive wheels) via the differential gear DF and drive shafts DS. The planetary gear 3, the gear train 4 and the differential gear DF constitute a transaxle that transmits part of an output torque of the engine 2 as a power generation source to wheels W and couples the engine 2 and the motor generator MG1 to each other.

The motor generator MG1 is mainly operated as a generator that is driven by the engine 2 under load operation and uses at least part of power from the engine 2 so as to generate electric power. The motor generator MG2 is coupled with the left and right wheels W via the drive gear 4d, the counter driven gear 4b, the final drive gear 4c, the differential gear DF including the differential ring gear Dr and the drive shafts DS. The motor generator MG2 is mainly driven by at least one of the electric power from the battery and the electric power from the motor generator MG1 so as to operate as an electric motor that outputs a driving torque to the drive shafts DS.

The battery 5 is a lithium-ion secondary battery in this embodiment. The battery 5 is managed by a battery management electronic control unit (hereinafter referred to as "battery ECU") 500 that includes a microcomputer with a CPU and the like (not shown). The battery ECU 500 acquires an inter-terminal voltage VB detected by a voltage sensor (not shown), a charging/discharging current IB detected by a current sensor (not shown), a temperature Tb of the battery 5 detected by a temperature sensor (not shown), and the like.

The battery ECU 500 or a battery management module calculates an integrated value of the charging/discharging current IB and also calculates SOC of the battery 5 based on the integrated value. Further, the battery ECU 500 calculates an allowable charging power Win (negative value), which is power allowed to charge the battery 5, based on the SOC and the temperature Tb, and also calculates an allowable discharging power Wout (positive value), which is power allowed to discharge the battery 5, based on the SOC and the temperature Tb. In this embodiment, the allowable charging power Win of battery 5 is set by multiplying a charging base value corresponding to the temperature Tb of battery 5 by a correction coefficient corresponding to the SOC. The set allowable charging power Win becomes smaller as the charging power (the absolute value becomes smaller) as the temperature Tb is lower and the SOC is higher. The allowable discharging power Wout is set by multiplying a discharging base value corresponding to the temperature Tb by a correction coefficient corresponding to the SOC. Further, the battery ECU 500 sets a target charging/discharging power Pb* of the battery 5 (where a discharging side is positive and a charging side is negative) based on the SOC to be a value within a range from the allowable charging power Win to the allowable discharging power Wout.

In addition, in order to protect the battery 5 and the like, the battery ECU 500 sets a charging power limit value IWin (negative value) based on a charging state of the battery 5 in accordance with well-known methods to suppress precipitation of lithium on a negative electrode of the battery 5 (lithium-ion secondary battery). When the allowable charging power Win based on the SOC and the temperature Tb is less than charging power limit value IWin based on the charging state of the battery 5, the battery ECU 500 sets the charging power limit value IWin to the allowable charging power Win. The charging power limit value IWin by correcting the allowable charging power Win such that an absolute value of the charging/discharging current (charging current) IB of the battery 5 does not exceed an absolute value of an allowable charging current equivalent to a maximum current which suppress precipitation of lithium on the negative electrode. The allowable charging current is calculated based on the charging/discharging current IB, the temperature Tb and the SOC such that the absolute value decreases with a charging duration and the absolute value increases with a discharging duration. When the charging power limit value IWin is set to the allowable charging power Win, the target charging/discharging power Pb* of the battery 5 is set (limited) to be equal to or more than the charging power limit value IWin (to have a smaller absolute value).

The PCU 6 includes a first inverter configured to drive the motor generator MG1, a second inverter configured to drive the motor generator MG2, a boost converter capable of boosting the electric power from battery 5 and stepping down the electric power from the side of motor generators MG1 and MG2, and the like (not shown). The PCU 6 is controlled by a motor electronic control unit (hereinafter referred to as "MGECU") 600 including a microcomputer with a CPU (not shown) and the like.

The HVECU 100 includes a microcomputer with a CPU, ROM, RAM, and input/output interface (not shown), various drive circuits, various logic ICs, and the like. The HVECU 100 acquires a vehicle speed V detected by a vehicle speed sensor (not shown), an accelerator opening Acc indicating a depressed amount of an accelerator pedal and detected by an accelerator pedal position sensor (not shown), a shift position SP of a shift lever detected by a shift position sensor (not shown), and the like. Further, the HVECU 100 mutually exchanges information with each of the ECUs 200, 500, 600, a brake electric control unit (not shown) that controls a hydraulic brake actuator (not shown), and the like. The HVECU 100 comprehensively controls the hybrid electric vehicle 1 based on the vehicle speed V, the accelerator opening Acc, signals from each of the ECUs 200, 500, 600, and the like.

Figure 2:
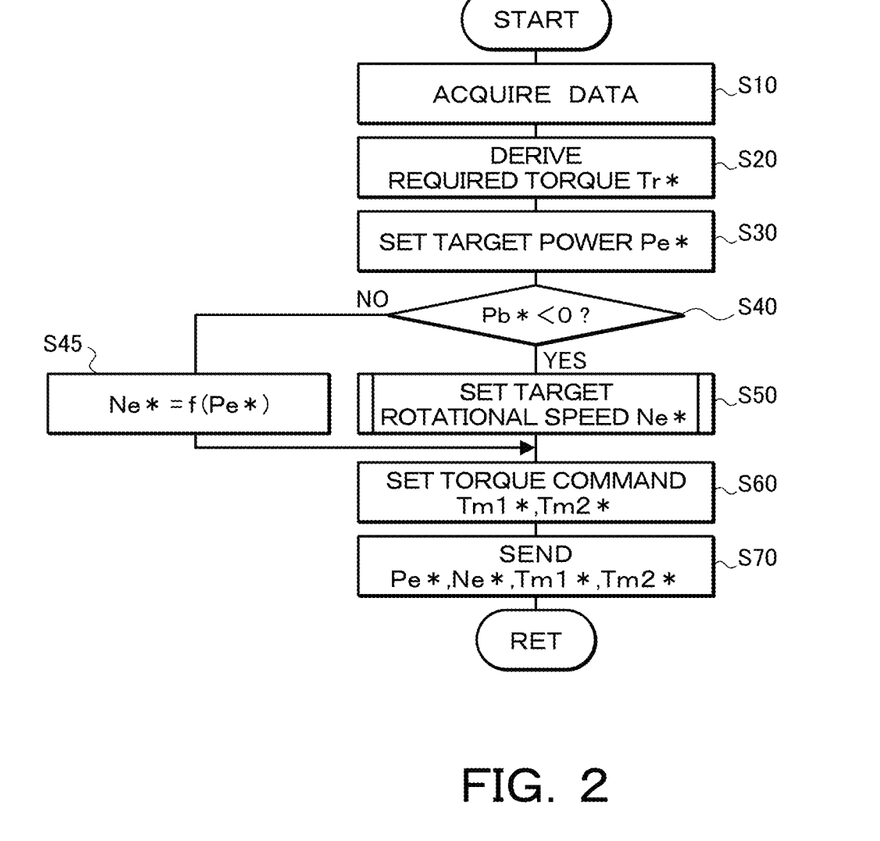
FIG. 2 is a flowchart exemplifying a routine executed by the control apparatus of the present disclosure when the engine of the hybrid electric vehicle of FIG. 1 is operated under load.

FIG. 2 is a flowchart exemplifying a drive control routine repeatedly executed by the HVECU 100 at a predetermined execution cycle when the engine 2 is under load. When an execution timing of the drive control routine of FIG. 2 arrives, the HVECU 100 (CPU) acquires data necessary for control (step S10). In step S10, HVECU 100 acquires the accelerator opening Acc from the accelerator pedal position sensor, the vehicle speed V from the vehicle speed sensor, rotational speeds Nm1 and Nm2 of the motor generators MG1 and MG2 from the MGECU 600, the temperature Tb of the battery 5, the target charging/discharging power Pb*, the allowable charging power Win, the allowable discharging power Wout, the charging power limit value IWin, and the like from the battery ECU 500.

Then, the HVECU 100 derives a required torque Tr* to be output to the drive shafts DS corresponding to the accelerator opening Acc and the vehicle speed V from a required torque setting map not shown in figures (step S20). Further, the HVECU 100 sets a required driving power Pd* (=Tr*× Nds) required for driving the hybrid electric vehicle 1 based on the required torque Tr* and a rotational speed Nds of the drive shafts DS. Furthermore, the HVECU 100 sets a target power Pe* (=Pd*−Pb*+loss) to be output by the engine 2 based on the required driving power Pd*, the target charging/discharging power Pb* acquired at step S10, and the like (step S30).

The HVECU 100 determines whether the target charging/discharging power Pb* is negative, that is, whether or not a charging of the battery 5 is requested (step S40). When the target charging/discharging power Pb* is equal to or more than zero and the charging of the battery 5 is not requested (step S40: NO), the HVECU 100 derives a required rotational speed Nrq corresponding to the target power Pe*, which is required for engine 2 to improve efficiency, from a predetermined operating line, that is, optimum fuel consumption line (step S45). Further, in step S45, the HVECU 100 sets the larger one of the required rotational speed Nrq and a lower limit rotational speed Nlim of the engine 2, which is set according to, for example, a driving condition of the hybrid electric vehicle 1, to a target rotational speed Ne* of the engine 2. The operating line is created in advance based on a so-called fuel consumption rate contour line such that the engine 2 operates efficiently. When the target charging/discharging power Pb* is a negative value and the charging of the battery 5 is requested (step S40: YES), the HVECU 100 executes a series of processing shown in FIG. 3 to set the target rotational speed Ne* (step S50).

After the process of step S40 or S50, the HVECU 100 sets torque commands Tm1* and Tm2* for MG1 and MG2 corresponding to the required torque Tr*, the target rotational speed Ne*, and the like within the range of the allowable charging power Win and the allowable discharging power Wout acquired at step S10 (step S60). Then, HVECU 100 sends the target power Pe* and the target rotational speed Ne* to the engine ECU 200, and sends the torque commands Tm1* and Tm2* to the MGECU 600 (step S70).

The engine ECU 200 controls the intake air amount, the fuel injection amount, the ignition timing, and the like of the engine 2 based on the target rotational speed Ne*, the target power Pe* and a target torque Te* (=Pe*/Ne*) corresponding to the target rotational speed Ne*, and the like. Thus, the engine 2 is controlled such that the rotational speed Ne becomes the target rotational speed Ne* and the engine 2 outputs a torque equivalent to the target torque Te*. The MGECU 600 executes switching control of the first and second inverters and the boost converter based on the torque commands Tm1* and Tm2*. When the engine 2 is under load, the motor generators MG1 and MG2 are controlled so as to perform a torque conversion of a part (at the time of charging) or all (at the time of discharging) of the power output from engine 2 together with planetary gear 3 and output it to the drive shafts DS.

Next, a procedure for setting the target rotational speed Ne* when the target charging/discharging power Pb* is a negative value and the charging of the battery 5 is requested will be described with reference to FIGS. 3 and 4.

Figure 3:
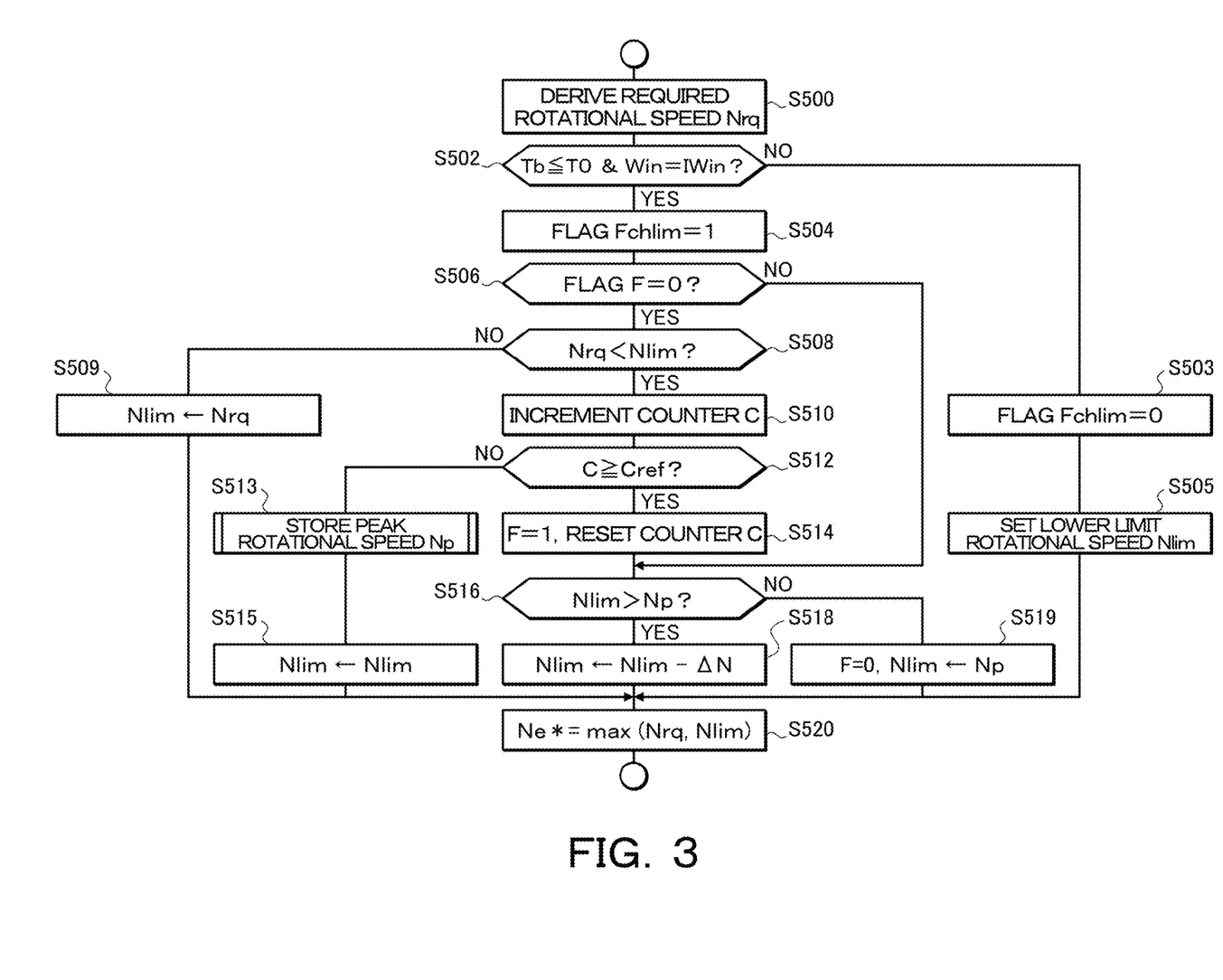
FIG. 3 is a flowchart showing sequence of processes in step S50 of FIG. 2.
Figure 4:
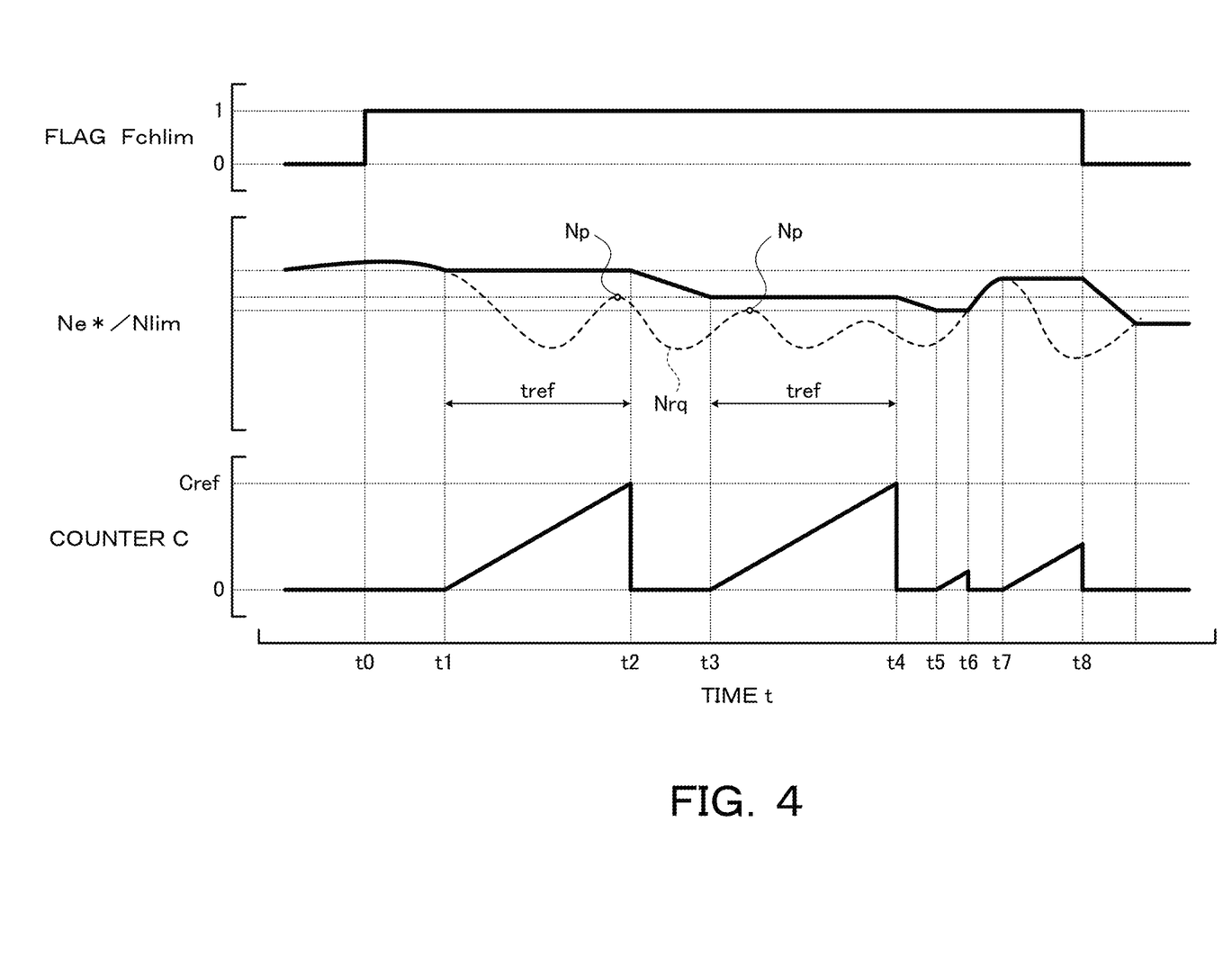
FIG. 4 is a time chart showing time changes in a target rotational speed of the engine and the like when the routine of FIG. 2 is executed by the control apparatus of the present disclosure.

As shown in FIG. 3, when the target charging/discharging power Pb* is a negative value (step S40: YES), the HVECU 100 derives the required rotational speed Nrq of the engine 2 corresponding to the target power Pe* from the above operating line (optimum fuel consumption line) (step S500). Further, the HVECU 100 determines whether or not the target charging/discharging power Pb* is limited to a small charging power by the battery ECU 500 or a battery management module (step S502). More detail, in step S502, the HVECU 100 determines whether or not the temperature Tb of the battery 5 acquired in step S10 is equal to or lower than a predetermined temperature T0 (for example, a temperature of around −10° C.) and the allowable charging power Win acquired in step S10 is limited by the charging power limit value IWin. When the temperature Tb of the battery 5 is equal to or lower than the predetermined temperature T0 and the allowable charging power Win matches the charging power limit value IWin, the HVECU 100 determines that the hybrid electric vehicle 1 is operated under a low temperature environment where lithium precipitation may occur and that the target charging/discharging power Pb* is limited to the small charging power by the battery ECU 500 (step S502: YES), and sets a charge limit flag Fchlim to "1" (step S504).

Then, the HVECU 100 determines whether or not a flag F is "0" (step S506). When the flag F is "0" (step S506: YES), the HVECU 100 determines whether or not the required rotational speed Nrq derived in step S500 is less than the lower limit rotational speed Nlim (step S508). When the required rotational speed Nrq is equal to or more than the lower limit rotational speed Nlim (step S508: NO), the HVECU 100 sets the required rotational speed Nrq derived in step S500 to the lower limit rotational speed Nlim of the engine 2 (step S509). Further, the HVECU 100 sets the larger one of the required rotational speed Nrq derived in step S500 and the lower limit rotational speed Nlim set in step S509 to the target rotational speed Ne* of the engine 2 (step S520) and executes the processes after step S60. When the required rotational speed Nrq is set to the lower limit rotational speed Nlim in step S509, the required rotational speed Nrq is set to the target rotational speed Ne* of the engine 2.

On the other hand, when the required rotational speed Nrq derived in step S500 is less than the lower limit rotational speed Nlim (step S508: YES), the HVECU 100 increments a counter C (step S510), and determines whether or not the counter C is equal to or more than a predetermined threshold Cref (step S512). The counter C indicates an elapsed time since the required rotational speed Nrq is determined to be less than the lower limit rotational speed Nlim. The threshold Cref used in step S512 is an integer obtained by dividing a time tref (predetermined time) selected from a range of 1 to 5 seconds by the execution cycle of the routine in FIG. 2.

When the counter C is less than the threshold Cref and the time tref has not elapsed since the required rotational speed Nrq becomes less than the lower limit rotational speed Nlim (step S512: NO), the HVECU 100 stores a peak rotational speed Np, which is a peak value of the required rotational speed Nrq derived in step S500, in RAM (step S513). That is, when the required rotational speed Nrq derived in step S500 is equal to or more than a previous value at the time of a previous execution of the routine in FIG. 2, the HVECU 100 stores the required rotational speed Nrq in the RAM as the peak rotational speed Np in step S513. When the required rotational speed Nrq derived in step S500 is less than the previous value, the HVECU 100 holds the required rotational speed Nrq to the previous value in step S513. Further, the HVECU 100 holds (sets) the lower limit rotational speed Nlim to the previous value at the time of the previous execution of the routine in FIG. 2 (step S515), and sets the larger one of the required rotational speed Nrq derived in step S500 and the lower limit rotational speed Nlim held in step S515 to the target rotational speed Ne* of the engine 2 (step S520). Then, the HVECU 100 executes the processes after step S60.

When the counter C is equal to or more than the threshold Cref and the time tref has elapsed since the required rotational speed Nrq becomes less than the lower limit rotational speed Nlim (step S512: YES), the HVECU 100 sets the flag F to "1" and resets the counter C (step S514). Further, the HVECU 100 determines whether or not the lower limit rotational speed Nlim is more than the peak rotational speed Np stored (acquired) in step S513 (step S516). When the lower limit rotational speed Nlim exceeds the peak rotational speed Np (step S516: YES), the HVECU 100 sets a value obtained by subtracting a previously adapted rate value $\Delta N$ from the lower limit rotational speed Nlim at the time of the previous execution of the routine in FIG. 2 to the current lower limit rotational speed Nlim (step S518). Further, the HVECU 100 sets the larger one of the required rotational speed Nrq derived in step S500 and the lower limit rotational speed Nlim set in step S518 to the target rotational speed Ne* of the engine 2 (step S520). Then, the HVECU 100 executes the processes after step S60.

When the routine in FIG. 2 is executed after the flag F is set to "1" in step S514, the processes after step S516 are executed since a negative determination is made in step S506. Thus, the lower limit rotational speed Nlim is set to gradually decrease. Further, when the lower limit rotational speed Nlim becomes equal to or less than the peak rotational speed Np (step S516: NO), the HVECU 100 sets the flag F to "0" and sets the peak rotational speed Np to the lower limit rotational speed Nlim (step S519). Also in this case, the HVECU 100 sets the larger one of the required rotational speed Nrq derived in step S500 and the lower limit rotational speed Nlim set in step S519 to the target rotational speed Ne* of the engine 2 (step S520) and executes the processes after step S60.

On the other hand, when the temperature Tb of the battery 5 acquired in step S10 exceeds the predetermined temperature T0 or the allowable charging power Win acquired in step S10 is more than the charging power limit value IWin (step S502: NO), the HVECU 100 sets the charge limit flag Fchlim to "0" (step S503), and sets a value corresponding to a driving state of the hybrid electric vehicle 1 and the like to the lower limit rotational speed Nlim of the engine 2 (step S505). When the lower limit rotational speed Nlim does not match the value corresponding to the driving state and the like of the hybrid electric vehicle 1, the HVECU 100 gradually changes the lower limit rotational speed Nlim to the value corresponding to the driving state and the like of the hybrid electric vehicle 1 using a previously adapted rate value. Then, the HVECU 100 sets the larger one of the required rotational speed Nrq derived in step S500 and the lower limit rotational speed Nlim set in step S505 to the target rotational speed Ne* of the engine 2 (step S520) and executes the processes after step S60.

As a result of executing the above drive control routine in FIG. 2, that is, the series of processes in step S50 shown in FIG. 3, in the hybrid electric vehicle 1, the target power Pe* of the engine 2 is set based on the required driving power Pd* required for driving the hybrid electric vehicle 1 and the target charging/discharging power Pb* of the battery 5 (step S30). Further, the larger one of the required rotational speed Nrq corresponding to the target power Pe* and the lower limit rotational speed Nlim is set to the target rotational speed of the engine 2 (steps S45, S50). When the target charging/discharging power Pb* is limited to the small charging power in the low temperature environment (step S502: YES) and the required rotational speed Nrq corresponding to the target power Pe* is equal to or more than the lower limit rotational speed Nlim of the engine 2 (step S508: NO), the required rotational speed Nrq is set to the lower limit rotational speed Nlim (step S509). When the required rotational speed Nrq is set to the lower limit rotational speed Nlim in step S509, the required rotational speed Nrq is set to the target rotational speed of the engine 2 (See from time t0 to t1 and from time t6 to t7 in FIG. 4).

Further, when the target charging/discharging power Pb* is limited to the small charging power in the low-temperature environment (step S502: YES) and the required rotational speed Nrq corresponding to the target power Pe* is less than the lower limit rotational speed Nlim (step S508: YES), the lower limit rotational speed Nlim is held (step S515) until the time tref (predetermined time) has elapsed since the required rotational speed Nrq becomes less than the lower limit rotational speed Nlim (step S512: NO). While the lower limit rotational speed Nlim is held in step S515, the lower limit rotational speed Nlim is set to the target rotational speed Ne* of the engine 2 (See from time t1 to t2, from time t3 to t4 and from time t5 to t6 in FIG. 4).

When the target charging/discharging power Pb* is limited to the small charging power in the low temperature environment (step S502: YES) and the time tref has elapsed since the required rotational speed Nrq becomes less than the lower limit rotational speed Nlim (step S512: YES), the lower limit rotational speed Nlim is set to gradually change to the peak rotational speed Np, which is a value within a fluctuation range of the required rotational speed Nrq within the time tref, according to the rate value $\Delta N$. When the required rotational speed Nrq remains low while the lower limit rotational speed Nlim is set in steps S518, S519, the lower limit rotational speed Nlim set in step S518 or S519 is set to the target engine speed Ne* (see from time t2 to t3 and from time t4 to t5 in FIG. 4).

That is, the HVECU 100 of the hybrid electric vehicle 1 sets the target rotational speed Ne* such that the rotational speed Ne of the engine 2 becomes the peak rotational speed Np included in the fluctuation range of the required rotational speed Nrq within the time tref (steps S518-520) when the state in which the target charging/discharging power Pb* is limited to the small charge power in the low temperature environment and the required rotational speed Nrq is less than the lower limit rotational speed Nlim continues for the time tref (step S512: YES). This suppress the rotational speed Ne of the engine 2 from stopping at a high level and the increase and decrease of the rotational speed Ne in a short cycle when the target charging/discharging power Pb* is limited to the smaller charging power (smaller absolute value) in order to suppress lithium precipitation in the low temperature environment for battery protection and the like and the target power Pe* of the engine 2 becomes smaller. Accordingly, the hybrid electric vehicle 1 suppresses noise and vibration to become apparent therein when the charging of the battery 5 by electric power from the motor generator MG1 that uses power from the engine 2 so as to generate electric power is limited in the low temperature environment.

Further, when the state in which the target charging/discharging power Pb* is limited to be small in the low temperature environment (step S502: YES) and the required rotational speed Nrq is less than the lower limit rotational speed Nlim continues for the time tref (step S512: YES), the HVECU 100 sets the target rotational speed Pe* such that the rotational speed Ne of the engine 2 gradually changes to the peak rotational speed Np within the fluctuation range of the required rotational speed Nrq within the time tref (steps S518-S520). This suppresses discomfort to a passenger of the hybrid electric vehicle 1 caused by the fluctuation in the rotational speed Ne of the engine 2.

In the above embodiment, the peak rotational speed Np is a maximum value (maximum rotational speed) within the fluctuation range of the required rotational speed Nrq within the time tref, or more precisely, the maximum value of an extreme values occurring within that fluctuation range. This suppresses enlargement in the fluctuation range of the rotational speed Ne of the engine 2 according to a change in the lower limit speed Nlim so as to satisfactorily suppress noise and vibration. In steps S518-520, the lower limit rotational speed Nlim (target rotational speed Ne*) may be set so as to gradually change to a value other than the peak rotational speed Np within the above fluctuation range, for example, an average of the required rotational speed Nrq within time tref.

The HVECU 100 sets the required rotational speed Nrq based on the target power Pe* such that the engine 2 is efficiently operated (step S500) and sets the required rotational speed Nrq to the lower limit rotational speed Nlim (step S509) when the target charging/discharging power Pb* is limited to the small charge power in the low temperature environment and the required rotational speed Nrq is equal to or more than the lower limit rotational speed Nlim (step S502: YES, step S508: NO). This prevents the target rotational speed Ne* from being limited more than necessary thereby reducing efficiency loss of the engine 2 when the target charging/discharging power Pb* is limited to the small charging power for battery protection and the like in the low temperature environment.

When the target charging/discharging power Pb* is the negative value and the charging of the battery 5 is requested (step S40: YES), the HVECU 100 determines whether or not the target charging/discharging power Pb* is limited to the small charging power (step S502) on the basis of the temperature Tb of the battery 5, the allowable charging power Win based on SOC and the temperature Tb, and the charging power limit value IWin based on the charging state of the battery 5. This makes it possible to properly determine whether or not the target charging/discharging power Pb* is limited to be small in the low temperature environment.

In the hybrid electric vehicle 1, the charging power limit value IWin is set to suppress lithium precipitation in the negative electrode of the battery 5. That is, the HVECU 100 suppresses the lithium precipitation resulted from deterioration due to the continued charging, thereby satisfactorily protecting the battery 5 while suppressing noise and vibration to become apparent in the hybrid electric vehicle 1 including the battery 5 which is the lithium ion secondary battery. The battery 5 may be a nickel-metal hydride secondary battery and the like other than the lithium ion secondary battery. When the battery 5 is the secondary battery other than the lithium ion secondary battery, step S502 may determines whether the target charging/discharging power Pb* is limited to the smaller charge power based on an item other than the charging power limit value IWin.

Further, in steps S518 and S505 of FIG. 3, the lower limit rotational speed Nlim may be gradually changed by a gradual change process other than the rate process using the rate value ΔN and the like. The HVECU 100 that executes the processes shown in FIGS. 2 and 3 may be applied to a hybrid electric vehicle other than the above hybrid electric vehicle 1 with the motor generators MG1, MG2 and planetary gear 3. That is, the hybrid electric vehicle to which the HVECU 100 is applied may be a one-motor type hybrid electric vehicle, a two-motor type hybrid electric vehicle without the planetary gear 3, or a series type hybrid electric vehicle, as long as it includes an electric motor (motor generator) mechanically connected to the crankshaft of the engine. Furthermore, in the hybrid electric vehicle 1, a stepped transmission may be interposed between the ring gear 3r, which is an output element of the planetary gear 3, and the differential gear DF instead of the gear train 4. The hybrid electric vehicle to which the HVECU 100 and the like are applied may be a plug-in hybrid electric vehicle (PHEV).

As has been described above, the control apparatus (100) of the hybrid electric vehicle (1) of the present disclosure includes the engine (2), the electric motor (MG1) that uses at least part of power from the engine (2) so as to generate electric power, and the battery (5) chargeable from electric power from the electric motor (MG1). The control apparatus (100) further includes: the target power setting module (S30) programmed to set the target power (Pe*) of the engine (2) based the power (Pd*) required for driving the hybrid electric vehicle (1) and the target charging power (Pb*) of the battery (5); and the target rotational speed setting module (S50, S500-S520) programmed to set the larger one of the required rotational speed (Nrq) of the engine (2) corresponding to the target power (Pe*) and the lower limit rotational speed (Nlim) to the target rotational speed (Ne*) of the engine (2). When the state in which the target charging power (Pb*) is limited to be small and the required rotational speed (Nrq) is less than the lower limit rotational speed (Nlim) continues for the predetermined time (tref), the target rotational speed setting module (S50, S500-S520) sets the target rotational speed (Ne*) such that the rotational speed (Ne) of the engine (2) becomes the value (Np) within the fluctuation range of the required rotational speed (Nrq) within the predetermined time (tref).

The control apparatus of the hybrid electric vehicle of the present disclosure sets the target power of the engine based on the power required for driving the hybrid electric vehicle and the target charging power of the battery and sets the larger one of the required rotational speed of the engine corresponding to the target power and the lower limit rotational speed to the target rotational speed of the engine.

Further, the control apparatus sets the target rotational speed such that the rotational speed of the engine becomes the value within the fluctuation range of the required rotational speed within the predetermined time when the state in which the target charging power is limited to be small and the required rotational speed is less than the lower limit rotational speed continues for the predetermined time. This suppress the rotational speed of the engine from stopping at a high level and the increase and decrease of the rotational speed in a short cycle when the target charging power is limited to a smaller charging power (smaller absolute value) for battery protection and the like and the target power of the engine becomes smaller. Accordingly, the control apparatus suppresses noise and vibration to become apparent in the hybrid electric vehicle when the charging of the battery by electric power from the electric motor that uses power from the engine so as to generate electric power is limited.

The target rotational speed setting module (S50) may be programmed to set the target rotational speed (Ne*) such that the rotational speed (Ne) of the engine (2) gradually changes to the value (Np) within the fluctuation range (S518-S520) when the state in which the target charging power (Pb*) is limited to be small and the required rotational speed (Nrq) is less than the lower limit rotational speed (Nlim) continues for the predetermined time (tref) (S508: YES, S512: YES).

This suppresses discomfort to a passenger of the hybrid electric vehicle caused by the fluctuation in the rotational speed of the engine.

The target rotational speed setting module (S50) may be programmed to set the target rotational speed (Ne*) such that the rotational speed (Ne) of the engine (2) becomes the maximum value (Np) within the fluctuation range (S518-S520) when the state in which the target charging power (Pb*) is limited to be small and the required rotational speed (Nrq) is less than the lower limit rotational speed (Nlim) continues for the predetermined time (tref) (S508: YES, S512: YES).

This suppresses enlargement in the fluctuation range of the rotational speed of the engine according to the change in the lower limit speed so as to satisfactorily suppress noise and vibration.

The target rotational speed setting module (S50) may be programmed to set the required rotational speed (Nrq) based on the target power (Pe*) such that the engine (2) is efficiently operated (S500). The target rotational speed setting module (S50) may be programmed to set the required rotational speed (Nrq) to the lower limit rotational speed (Nlim) when the target charging power (Pb*) is limited to be small (S502: YES) and the required rotational speed (Nrq) is equal to or more than the lower limit rotational speed (Nlim) (S508: NO).

This prevents the target rotational speed from being limited more than necessary thereby reducing the efficiency loss of the engine when the target charging power is limited to the small charging power for battery protection and the like.

The control apparatus may include the battery management module (500) programmed to set the allowable charging power (Win) based on SOC and temperature (Tb) of the battery (5) and set the charging power limit value (IWin) of the battery (5) based on the charging state of the battery (5). When the allowable charging power (Win) is less than the charging power limit value (IWin), the battery management module (500) may set the charging power limit value (IWin) to the allowable charging power (Win) and limits the target charging power (Pb*) to be small. When the battery (5) is required to be charged, the target rotational speed setting module (S50) may determine whether or not the target charging power (Pb*) is limited to be small based on temperature (Tb) of the battery (5), the allowable charging power (Win) and the charging power limit value (IWin) (S502).

This makes it possible to properly determine whether or not the target charging power is limited to be small in the low temperature environment.

The battery (5) may be the lithium ion secondary battery. The charging power limit value (IWin) may be set to suppress lithium precipitation in the negative electrode of the battery (5). The control apparatus of the present disclosure suppresses the lithium precipitation resulted from deterioration due to the continued charging, thereby satisfactorily protecting the battery while suppressing noise and vibration to become apparent in the hybrid electric vehicle including the lithium ion secondary battery. The control device of the present disclosure may be applied to a hybrid electric vehicle including a battery other than the lithium ion secondary battery, such as the nickel-metal hydride secondary battery.

The control method of the present disclosure is adapted to the hybrid electric vehicle (1) includes the engine (2), the electric motor (MG1) that uses at least part of power from the engine (2) so as to generate electric power, and the battery (5) chargeable from electric power from the electric motor (MG1). The method includes: setting the target power (Pe*) of the engine (2) based on the power (Pd*) required for driving the hybrid electric vehicle (2) and the target charging power (Pb*) of the battery (5); and setting the larger one of the required rotational speed (Nrq) of the engine (2) corresponding to the target power (Pe*) and the lower limit rotational speed (Nlim) to the target rotational speed (Ne*) of the engine (2). When the state in which the target charging power (Pb*) is limited to be small and the required rotational speed (Nrq) is less than the lower limit rotational speed (Nlim) continues for the predetermined time (tref), the target rotational speed (Ne*) is set such that the rotational speed (Ne) of the engine (2) becomes the value (Np) within the fluctuation range of the required rotational speed (Nrq) within the predetermined time (tref).

The control method suppresses noise and vibration to become apparent in the hybrid electric vehicle when the charging of the battery by electric power from the electric motor that uses power from the engine so as to generate electric power is limited.

The disclosure is not limited to the above embodiments in any sense but may be changed, altered or modified in various ways within the scope of extension of the disclosure. Additionally, the embodiments described above are only concrete examples of some aspect of the disclosure described in Summary and are not intended to limit the elements of the disclosure described in Summary.

INDUSTRIAL APPLICABILITY

The technique of the present disclosure is applicable to, for example, the manufacturing industry of the hybrid electric vehicle.

The invention claimed is:

1. A control apparatus of a hybrid electric vehicle that includes an engine, an electric motor that uses at least part of power from the engine so as to generate electric power, and a battery chargeable from electric power from the electric motor, the control apparatus comprising:

a target power setting module programmed to set a target power of the engine based on a power required for driving the hybrid electric vehicle and a target charging power of the battery; and a target rotational speed setting module programmed to
- set a larger one of a required rotational speed of the engine corresponding to the target power and a lower limit rotational speed to a target rotational speed of the engine, and
- set the target rotational speed such that a rotational speed of the engine becomes a value within a fluctuation range of the required rotational speed within a predetermined time when a state in which the target charging power is limited and the required rotational speed that is less than the lower limit rotational speed continues for the predetermined time.

2. The control apparatus according to claim 1,
wherein the target rotational speed setting module is programmed to set the target rotational speed such that the rotational speed of the engine gradually changes to the value within the fluctuation range when the state in which the target charging power is limited and the required rotational speed that is less than the lower limit rotational speed continues for the predetermined time.

3. The control apparatus according to claim 1,
wherein the target rotational speed setting module is programmed to set the target rotational speed such that the rotational speed of the engine becomes a maximum value within the fluctuation range when the state in which the target charging power is limited and the required rotational speed that is less than the lower limit rotational speed continues for the predetermined time.

4. The control apparatus according to claim 1,
wherein the target rotational speed setting module is programmed to set the required rotational speed based on the target power, and
wherein the target rotational speed setting module is programmed to set the required rotational speed to the lower limit rotational speed when the target charging power is limited and the required rotational speed is equal to or more than the lower limit rotational speed.

5. The control apparatus according to claim 1, further comprising:
a battery management module programmed to set an allowable charging power of the battery based on SOC and temperature of the battery and set a charging power limit value of the battery based on a charging state of the battery;
wherein the battery management module is programmed to set the charging power limit value to the allowable charging power and limits the target charging power when the allowable charging power is less than the charging power limit value, and
wherein the target rotational speed setting module is programmed to determine whether or not the target charging power is limited based on temperature of the battery, the allowable charging power and the charging power limit value when the battery is required to be charged.

6. The control apparatus according to claim 5,
wherein the battery is a lithium ion secondary battery; and
wherein the charging power limit value is set to suppress lithium precipitation in a negative electrode of the battery.

7. A control method of a hybrid electric vehicle that includes an engine, an electric motor that uses at least part of power from the engine so as to generate electric power, and a battery chargeable from electric power from the electric motor, the method comprising:
setting a target power of the engine based on a power required for driving the hybrid electric vehicle and a target charging power of the battery; and
setting a larger one of a required rotational speed of the engine corresponding to the target power and a lower limit rotational speed to a target rotational speed of the engine, and setting the target rotational speed such that a rotational speed of the engine becomes a value within a fluctuation range of the required rotational speed within a predetermined time when a state in which the target charging power is limited and the required rotational speed that is less than the lower limit rotational speed continues for the predetermined time.

\* \* \* \* \*